April 11, 1961 R. F. SCHALK 2,979,175
CONTROL APPARATUS
Filed March 12, 1956 2 Sheets-Sheet 1
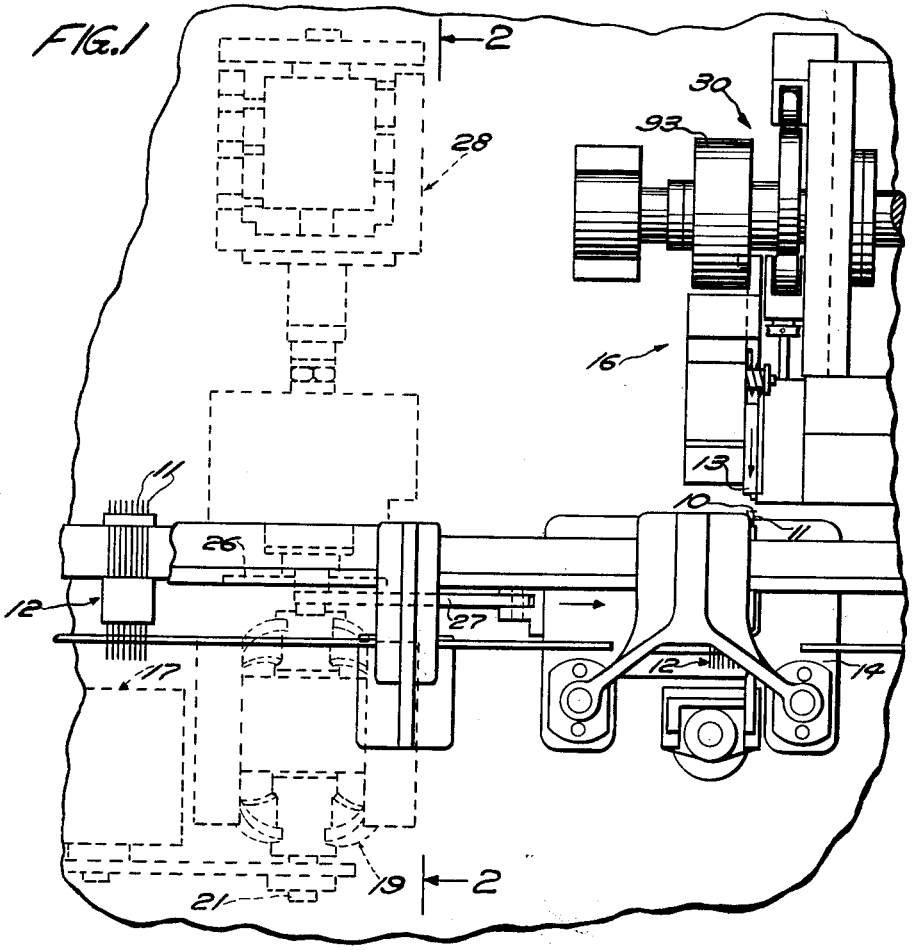
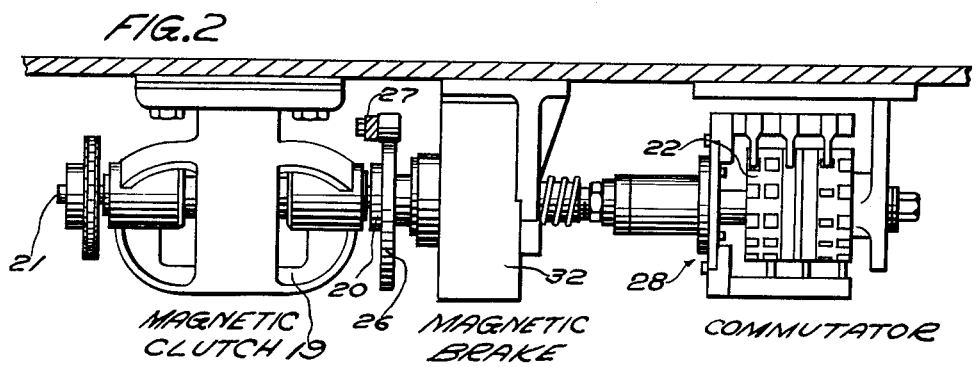
INVENTOR
R.F. SCHALK
BY J.M.Hall
ATTORNEY

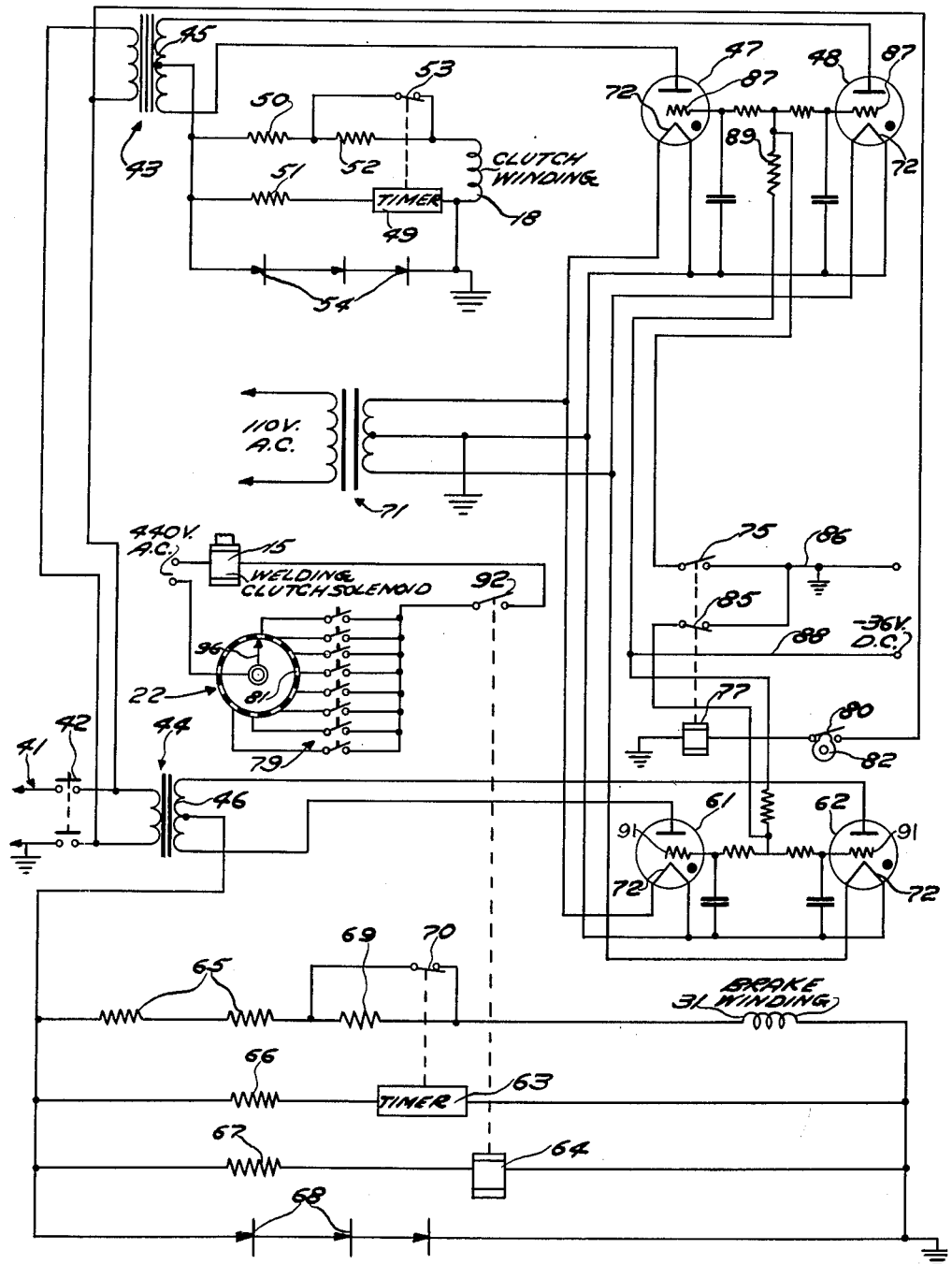

2,979,175
Patented Apr. 11, 1961

2,979,175
CONTROL APPARATUS

Robert F. Schalk, Madison, Wis., assignor to Western Electric Company, Incorporated, New York, N.Y., a corporation of New York Filed Mar. 12, 1956, Ser. No. 570,789

11 Claims. (Cl. 192—12)

This invention relates to control apparatus, and more particularly to indexing drives for wire spring relay welding machines.

An object of the invention is to provide new and improved control apparatus.

Another object of the invention is to provide new and improved indexing drives for wire spring relay welding machines.

A further object of the invention is to provide indexing drives having magnetic clutches for effecting driving movements, magnetic brakes for stopping driving movements and power supplies providing high excitation voltages for the clutches and brakes and low maintaining voltages for the clutches and brakes so that instantaneous actuations of these elements are effected.

In a control apparatus illustrating certain features of the invention, means may be provided for rapidly dissipating decay currents of an inductor and means also may be provided for rapidly energizing the inductor.

In an apparatus forming a more specific embodiment of the invention, a magnetic device for controlling a drive is given a high voltage shot or impulse to initially excite it and then voltage-control means reduces the voltage to a value just sufficient to maintain the magnetic device effective. Two such magnetic devices, one a clutch for supplying power to an indexing drive and the other a brake for stopping the drive may be used to provide very rapid and precise indexing.

A complete understanding of the invention may be obtained from the following detailed description of a control apparatus forming a specific embodiment thereof, when read in conjunction with the appended drawings, in which—

Fig. 1 is a fragmentary, top plan view of an indexing drive associated with control apparatus forming one embodiment of the invention;

Fig. 2 is a vertical section taken along line 2—2 of Fig. 1, and

Fig. 3 is a diagrammatic view of a control circuit for the drive shown in Fig. 1.

The apparatus shown in Fig. 1 of the drawings percussively welds contacts 10 to wires 11 of wire spring relay combs 12, and includes a contact welding gun or electrode 13 of a welding mechanism 16 relative to which each comb on an indexable table 14 is moved by the table so successively and selectively present the wires 11 in alignment with the gun 13 for welding the contacts thereto. When an indexing clutch winding 18 (Fig. 3) of a magnetic clutch 19 of a well known type is energized, power is supplied to a shaft 20 by the clutch 19 from a shaft 21 continuously driven by a motor 17. A very satisfactory clutch is the standard Magne Clutch No. 6-2-2 manufactured by Vickers Electric Division of the Sperry Corporation. The electrode 13 and the welding mechanism 16 are actuated by a welding clutch solenoid 15 (Fig. 3) actuating a one-revolution clutch as disclosed and claimed in copending application Serial No. 562,405, filed January 31, 1956, now Patent No. 2,809,273, granted October 8, 1957, by A. L. Quinlan and R. F. Schalk for "Apparatus for Selectively Forming and Welding Contacts Onto Electric Components." The shaft 20 drives a commutator device 28 having a commutator 22 and also drives a stepped indexing cam 26, which moves the table 14 step-by-step past the electrode 13 through a linkage 27. The cam 26 and the linkage 27 are disclosed and claimed in the above-mentioned copending application. At the end of each selected indexing step of the table 14, the clutch winding 18 is deenergized instantaneously and a brake winding 31 (Fig. 3) of a magnetic brake 32 of a well known type is energized instantaneously to stop the shaft 20 and the indexing cam 26 thereon in positions aligning the desired one of the wires 11 with the electrode 13. The brake may be standard Magne Brake No. 32D43 manufactured by Vickers Electric Division of the Sperry Corporation. Then, if that wire is to have a contact 10 welded thereto, the welding mechanism 16 is actuated through the solenoid 15 and a drive 30 to percussively weld one of the contacts 10 on the end of the aligned wire 11, after which the table 14 again is indexed to align the next preselected wire 11 with the electrode 13 and another weld is effected.

A power line 41 (Fig. 3) having a manually operable switch 42 therein supplies power to step-up transformers 43 and 44 having center-tapped secondary windings 45 and 46, respectively. Thyratron tubes 47 and 48 are connected to the ends of the winding 45 to form a heavy duty, high voltage, potential-controlled full-wave rectifier to selectively supply power to the indexing clutch winding 18 and a timer or time delay relay 49. The output voltage of the transformer 43 is several times as high as the rating of the winding 18. Resistors 50 and 51 are connected in series with the winding 18 and the timer 49, respectively. The resistance of the resistor 50 is chosen at a sufficiently high value so that the ratio of the inductance of the winding 18 to the resistance of the resistor 50 is low so as to provide a low time constant for the circuit comprising the winding 18 and the resistor 50. A resistor 52 and shunting contacts 53 of the timer 49 connect the clutch winding 18 to the resistor 50. Junction type rectifiers 54 are provided to rapidly shunt decay current of the winding 18 to deenergize it instantaneously, the resistors 50 and 52 also giving a low time constant to the decay current circuit composed of the resistors 50 and 52, the winding 18 and the rectifiers 54. The direction of rectification of the rectifiers 54 is such that no currents flows therethrough except the decay currents.

Thyratron tubes 61 and 62 form a heavy duty, high voltage, potential-controlled full-wave rectifier for the transformer 44 to supply power to the brake winding 31, a timer or time delay relay 63 and a relay 64 controlling the welding clutch solenoid 15. Resistors 65, 66 and 67 and decay-current-shunting rectifiers 68 are provided in the circuit supplied by the transformer 44 to rapidly deenergize the winding 31 when exciting voltage is removed therefrom. The brake winding 31 is connected to the resistors 65 by a resistor 69 in parallel with shunting contacts 70 of the timer 63. The resistors 65 give a low time constant to the circuit including the winding 31 and the contacts 70 so that, with the contacts 70 closed, application of voltage to this circuit rapidly energizes the winding 31, the original voltage from the transformer 44 being several times as high as the rating of the brake winding 31.

A filament voltage transformer 71 is provided for supplying power to filaments 72 of the thyratrons 47, 48, 61 and 62. The conductivity of the thyratrons 47 and 48 is controlled by contacts 75 of relay 77 which in turn is controlled by a cam switch 80 operable by a cam 82 driven continuously with the shaft 21. Manually operable selector switches 79 may be manually set either open or closed. There is one live commutator segment 81 and one switch 79 for each of eight wires 11 of each comb 12, and the switch 79 for each wire 11 to have a contact 10 to be welded thereto is closed by an operator. As each wire to have a contact 10 welded thereto is brought to the welding position in alignment with the electrode 13 and the cam 82 opens the cam switch 80, the relay 77 is dropped out to open the contacts 75 and close contacts 85. Opening of contacts 75 removes a relatively positive potential from a positive power line conductor 86 to grids 87 of the thyratron tubes 47 and 48 and a negative potential is applied to these grids from a negative power line conductor 88 through a bias resistor 89 to prevent conduction of the tubes 47 and 48. This deenergizes the clutch winding 18.

Closing of contacts 85 energizes brake winding 31 instantly by connecting the positive conductor 86 to grids 91 of the thyratron tubes 61 and 62 making these tubes conductive, the resistor 69 being by-passed by contacts 70 of the timer 63 so that a high initial surge of current to the winding 31 is provided to energize the winding 31 immediately. The timer 63 also is started by conduction of the thyratrons 61 and 62, and, after a delay of a fraction of a second, sufficient for the brake winding 31 to be fully energized by the initial surge of current, opens the contacts to reduce the voltage applied to the winding 31 to a voltage just sufficient to keep the brake 32 effective to prevent rotation of the shaft 20. The relay 64 also is energized at this time to close contacts 92 to the solenoid 15. The solenoid 15 actuates a one-revolution clutch 93 of the welding head drive 30 through the closed selector switch 79 and commutator segment 81 and brush 96. The welding electrode 13 then welds a contact 10 to the wire aligned therewith and is retracted. Then the cam 82 recloses the switch 80 to energize the relay 77, which makes the tubes 47 and 48 conductive and makes the tubes 61 and 62 non-conductive. This rapidly drops out the brake winding 31, the relay 64 and the welding clutch solenoid 15, the rectifiers 68 and the resistors 65 and 69 and 67 causing the winding 31 and the relay 64 to be deenergized rapidly.

Firing of the tubes 47 and 48 cause a high initial energizing surge of current of a duration of a fraction of a second, sufficient to fully excite the winding 18, through the winding 18 and the timer contacts 53 to ground. Simultaneously the shaft 20 is driven to index the comb 12 one wire and turn the commutator 22 through an angle of 30°. Meanwhile, as soon as the winding 8 is fully excited or energized a small fraction of a second after the triggering of the tubes 47 and 48, the timer 49 opens the contacts 53 to throw in the resistor 52, which reduces the current through the winding 18 to a current just sufficient to prevent slippage of the clutch 19. As the indexing is completed, the cam 82 again opens the switch 80 to instantaneously energize the brake winding 31 and instantaneously deenergize the clutch winding 18. The brake stops the table in a position precisely aligning the next wire 11 with the gun 13, and, if the switch 79 connected to the commutator segment 81 being contacted by the brush 96 is closed, a contact 10 is welded to this wire. If that switch 79 is open, the solenoid 15 is kept deenergized and no weld is effected. Then the cam 82 closes the switch 80 to start the next cycle of indexing and welding.

Only the first eight of the commutator segments 81 are connected to the switches 79, the latter four segments 81 being dead. The cam 26 moves the table to the right, as viewed in Fig. 1, during the first eight steps during which the first eight segments 81 are contacted by the brush 96. During the last four indexing steps the table 14 is returned to the left to its starting position. The comb 12 on the table 14 is removed from the table and the next comb 12 is positioned on the table by the structure disclosed and claimed in the above-mentioned copending application, no welding being done during the return of the table or carriage 14.

The provision of the resistors 65 and the timer contacts 70, which shunt the resistor 69 during the initial portion of the energization of the brake winding, during which the winding 31 requires a large current to make the brake 32 effective, causes the shaft 20 to be stopped instantaneously so that precise indexing is obtained. Then the timer 63 opens the contacts 70 to make the resistor 69 effective, which reduces the current through the brake winding 31, this winding requiring much less current to keep the brake 32 effective after the initial excitation than that required during the initial excitation. Also, there is provided a much higher voltage source in the transformer 44 than is required across the winding 31. The resistors 65 are provided to reduce the voltage to that desired. This combination gives the circuit a low time constant both for quick energization and quick deenergization. Similarly, the indexing clutch winding 18 requires a much higher current during the initial or excitation portion of each energization thereof than after this portion. This is effected by initially shunting the resistor 52 to place a high voltage on the winding 18 and then removing the shunt just as the winding becomes fully excited. The voltage supplied by the power source including the thyratrons 47 and 48 and the transformer 43 is much higher than necessary for the winding 18 even during initial excitation thereof, and this voltage is reduced by the resistor 50 to the value desired. The result is that the indexing clutch winding is excited instantly to give instantaneous locking actuation of the clutch 19, and then the voltage to the winding is reduced to a value non-damaging to the winding 18 during prolonged energization thereof. The rectifiers 54 and the resistors 50 and 52 also rapidly deenergize the winding 18 when the tubes 47 and 48 are made non-conductive.

While in the above-described embodiment of the invention the carriage or indexing table 14 is stopped after each indexing movement thereof whether or not a welding operation is made during each pause of the table, it is obvious that the above-described power supplies for the windings 18 and 31 and the circuit arrangements for providing high excitation currents to the windings 18 and 31 and low maintaining currents thereto can be used with the skip-stop control circuit disclosed and claimed in the above-mentioned copending application so that there would be no substantial pause in the indexing movement of the table 14 where there is to be no contact 10 welded to the wire 11 just brought into alignment with the gun 14. Also, the table would be returned, after eight indexing steps, continuously to its starting position.

It is to be understood that the above-described arrangements are simply illustrative of the application of the principles of the invention. Numerous other arrangements may be readily devised by those skilled in the art which will embody the principles of the invention and fall within the spirit and scope thereof.

What I claim is:

1. An indexing drive comprising indexing means, means for driving the indexing means, magnetic clutch means for actuating the driving means, magnetic brake means for stopping the driving means, power supply means for applying a high exciting voltage and a low sustaining voltage to the magnetic clutch means, and a second power supply means for applying a high exciting voltage and a low sustaining voltage to the magnetic brake means.

2. In a welding machine including a table for carrying a wire spring relay comb, an indexing drive for the table and magnetic brake means for stopping the drive, the combination therewith of a high voltage brake transformer, a pair of gas-filled tubes for rectifying the output of the brake transformer, variable impedance means for connecting the brake means to the tubes, and means for actuating the variable impedance means to increase the impedance to the brake means after it is initially excited.

3. In a welding machine including a table for carrying a wire spring relay comb, an indexing drive for the table and magnetic means for controlling the drive, the combination therewith of a high voltage power supply, variable impedance means connecting the magnetic means to the power supply, and timing means varying the impedance means to increase its effect on the magnetic means after the magnetic means is initially energized.

4. In a welding machine including a table for carrying a wire spring relay comb, an indexing drive for the table, magnetic clutch means for actuating the drive and magnetic brake means for stopping the drive, the combination therewith of a high voltage clutch transformer, a high voltage brake transformer, a first pair of thyratron tubes for rectifying the output of the clutch transformer, a second pair of thyratron tubes for rectifying the output of the brake transformer, impedance means for connecting the clutch means to the first pair of thyratron tubes, first shunt means for shunting the impedance means, second impedance means for connecting the brake means to the second pair of thyratron tubes, second shunt means for shunting the second impedance means, switch means operable when in one condition for continuously triggering the first pair of tubes and when in a second condition for continuously triggering the second pair of tubes, timing means for placing the switch means alternately in the first and second conditions, delay means operable by the timing means for opening the first shunt means shortly after the first tubes are initially triggered, and delay means operable by the timing means for opening the second shunt means shortly after the second pair of tubes is initially triggered.

5. In a welding machine including a table for carrying a wire spring relay comb, an indexing drive for the table and magnetic means for actuating the drives, the combination therewith of a high voltage transformer, a pair of thyratron tubes for rectifying the output of the transformer, impedance means for connecting the magnetic means to the thyratron tubes, shunt means for shunting the impedance means, control means operable when in one condition for continuously triggering the tubes and when in a second condition for continuously rendering the tubes non-conductive, timing means for placing the control means alternately in the first and second conditions, and delay means operable by the timing means for opening the shunt means shortly after the tubes are initially triggered.

6. In a welding machine including a table for carrying a wire spring relay comb, an indexing drive for the table and magnetic brake means for stopping the drive, the combination therewith of a high voltage brake transformer, a pair of thyratron tubes for rectifying the output of the brake transformer, shunt means for shunting the impedance means, control means operable when in one condition for continuously triggering the pair of tubes and when in a second condition for contniuously rendering the tubes non-conductive, timing means for placing the control means alternately in the first and second conditions, and delay means operable by the timing means for opening the shunt means shortly after the tubes are initially triggered.

7. A drive system comprising a driver, a driven device, a magnetic clutch having an actuating winding for connecting the driver to the driven device, a power supply, resistance means connected in series with the power supply and the clutch winding and being of such a resistance relative to the inductance of the clutch winding as to form a low-time-constant circuit therewith, rectifying means shunting the resistance means and the clutch winding for conducting decay currents of the clutch winding, and means for alternately connecting and disconnecting the power supply means to the mentioned resistance means and the clutch winding.

8. A drive system comprising a driver, a driven device, an electromagnetic brake having an actuating winding for stopping the driven device, a power supply, resistance means connected in series with the brake winding and the power supply and being of such a resistance relative to the inductance of the brake winding as to form a low-time-constant circuit therewith, and valve means for alternately connecting and disconnecting the power supply means to and from the resistance means and the brake winding.

9. A drive system comprising a driver, a driven device, a magnetic clutch having an actuating winding for connecting the driver to the driven device, a magnetic brake having an actuating winding for stopping the driven device, a power supply, resistance means connected in series with the power supply and the clutch winding and being of such a resistance relative to the inductance of the clutch winding as to form a low-time-constant circuit therewith, rectifying means shunting the resistance means and the clutch winding for conducting decay currents of the clutch winding, resistance means connected in series with the brake winding and the power supply and being of such a resistance relative to the inductance of the clutch winding as to form a low-time-constant circuit therewith, second rectifying means shunting the second resistance means and the brake winding for conducting decay currents of the brake winding, and thermionic valve means for alternately connecting the power supply means to the first-mentioned resistance means and the clutch winding and the second resistance means and the brake winding.

10. In a magnetic drive system, a magnetic clutch having an energizing winding, a power supply, a resistor connected in series with said winding, a shunt circuit having a normally closed contact connected across said resistor, a normally unoperated timer for opening said contact after a predetermined time delay, means for selectively connecting the power supply to said resistor and timer whereby the timer opens the contact after said predetermined time delay.

11. In a magnetic drive system, a magnetic clutch having an energizing winding, a magnetic brake having an energizing winding, a first resistor connected to said clutch winding, a second resistor connected to said brake winding, a first shunt circuit having a normally closed contact connected across said first resistor, a second shunt circuit having a normally closed contact connected across said second resistor, a power supply, a first timer associated with said first resistor and adapted to be operated by said power supply to open the contact in said first shunt circuit after a predetermined time delay, a second timer associated with said second resistor and adapted to be operated by said power supply to open the contact in said second shunt circuit, and means for alternately connecting said power supply to said first and second resistors and the associated timers whereby each timer opens associated contact after said predetermined time delay.

References Cited in the file of this patent
UNITED STATES PATENTS

| | | |
|---|---|---|
| 1,855,736 | White | Apr. 26, 1932 |
| 2,104,200 | Kopp | Jan. 4, 1938 |
| 2,411,122 | Winther | Nov. 12, 1946 |
| 2,630,467 | Winther | Mar. 3, 1953 |
| 2,687,197 | Leifer | Aug. 24, 1954 |
| 2,718,951 | Mason | Sept. 27, 1955 |
| 2,728,878 | Sperr | Dec. 27, 1955 |
| 2,775,129 | Pevas | Dec. 25, 1956 |
| 2,788,104 | Mason | Apr. 9, 1957 |
| 2,828,846 | Viguers et al. | Apr. 1, 1958 |